(12) United States Patent
Mitsumoto

(10) Patent No.: US 11,790,583 B2
(45) Date of Patent: Oct. 17, 2023

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Shinichi Mitsumoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 404 days.

(21) Appl. No.: 17/191,861

(22) Filed: Mar. 4, 2021

(65) Prior Publication Data
US 2021/0304471 A1 Sep. 30, 2021

(30) Foreign Application Priority Data
Mar. 27, 2020 (JP) ................. 2020-058310

(51) Int. Cl.
G06T 11/60 (2006.01)
G06T 7/00 (2017.01)

(52) U.S. Cl.
CPC ............ G06T 11/60 (2013.01); G06T 7/0002 (2013.01); *G06T 2207/30168* (2013.01)

(58) Field of Classification Search
CPC ................... G06T 11/60; G06T 7/0002; G06T 2207/30168; G06T 11/00; G06T 2207/20212; G06T 7/30

USPC ......................................................... 382/284
See application file for complete search history.

(56) References Cited

U.S. PATENT DOCUMENTS 11,416,973 B2 * 8/2022 Abergel .................... G06T 5/50
2021/0304471 A1 * 9/2021 Mitsumoto ............. G06T 11/60

FOREIGN PATENT DOCUMENTS

JP 2006175620 A 7/2006
JP 6513309 B2 5/2019
WO 2018105097 A1 6/2018

* cited by examiner

*Primary Examiner* — Neil R McLean
(74) *Attorney, Agent, or Firm* — Carter, DeLuca & Farrell LLP

(57) ABSTRACT

An image processing apparatus comprises one or more processors, wherein the one or more processors function as: a first obtaining unit configured to obtain a plurality of images having an overlapping region which is a region that is captured by overlapping at least a portion of a capturing target, a second obtaining unit configured to obtain in-focus degree information in the overlapping region of each of the plurality of images, wherein the in-focus degree information indicates a degree of focus for each predetermined region of the image, and a compositing unit configured to, based on the in-focus degree information of each of the plurality of images, generate a composited image for which the plurality of images are composited.

11 Claims, 9 Drawing Sheets

FIG. 3A

| COMPOSITED IMAGE SIZE | FILENAME |
|---|---|
| 5000×2000 | IMG_0013.jpg, IMG_0014.jpg |

| OVERLAPPING REGION ID | COMPOSITED REGION COORDINATES | IMAGE1_FILENAME | IMAGE1_OVERLAPPING REGION COORDINATES | IMAGE2_FILENAME | IMAGE2_OVERLAPPING REGION COORDINATES |
|---|---|---|---|---|---|
| 0 | (2000, 0, 3000, 2000) | IMG_0013.jpg | (2000, 0, 3000, 2000) | IMG_0014.jpg | (0, 0, 1000, 2000) |

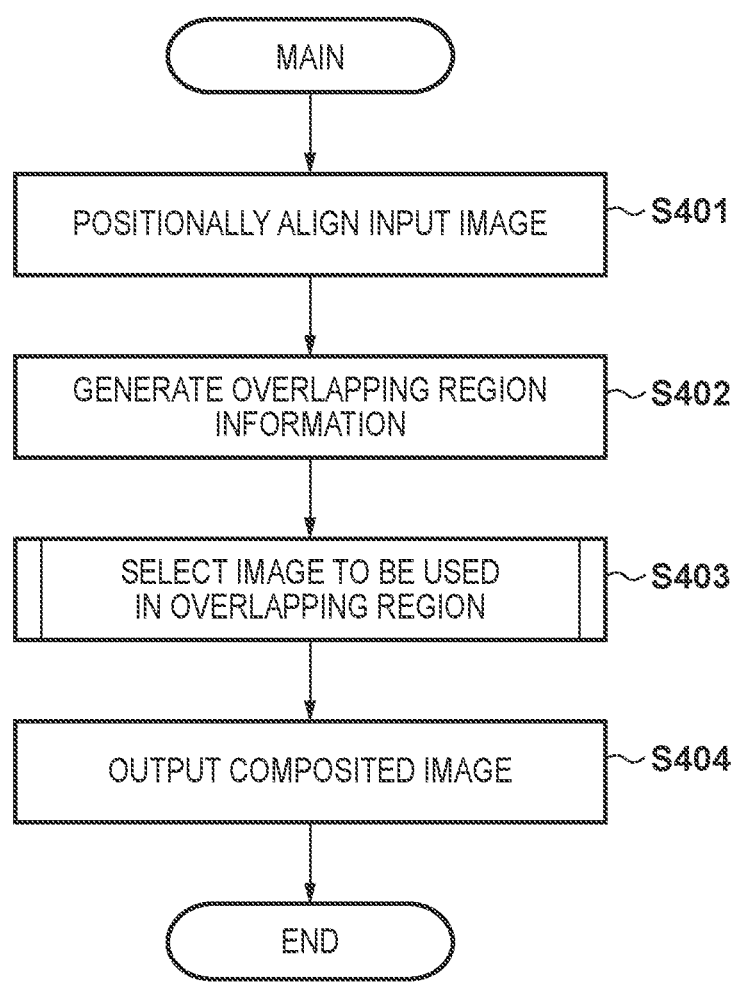

FIG. 8
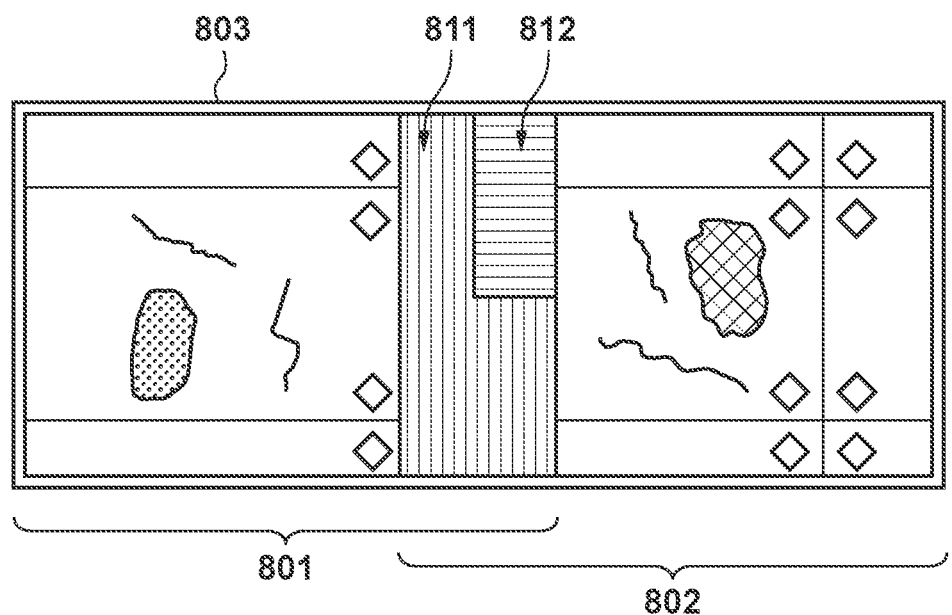
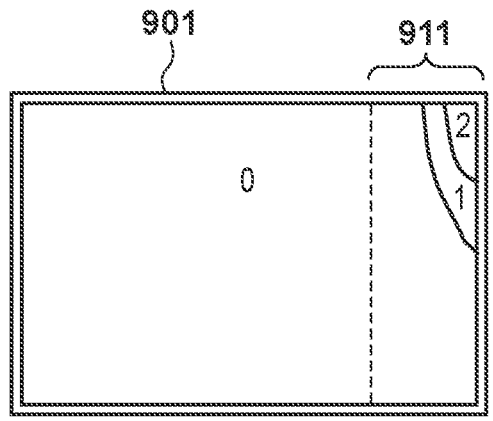
FIG. 9A
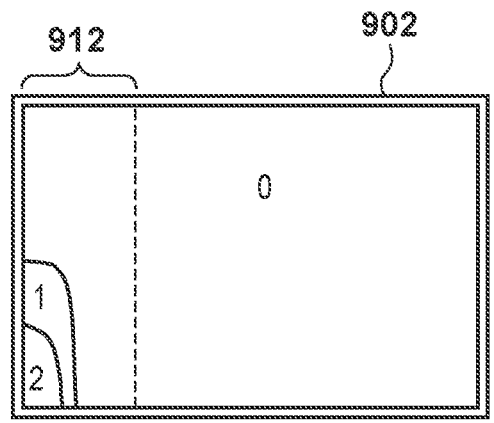
FIG. 9B

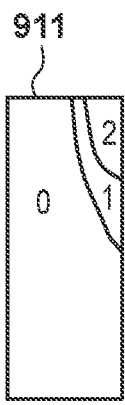
FIG. 11A
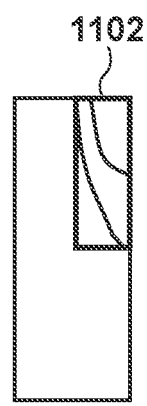
FIG. 11B
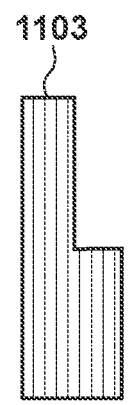
FIG. 11C
FIG. 12A
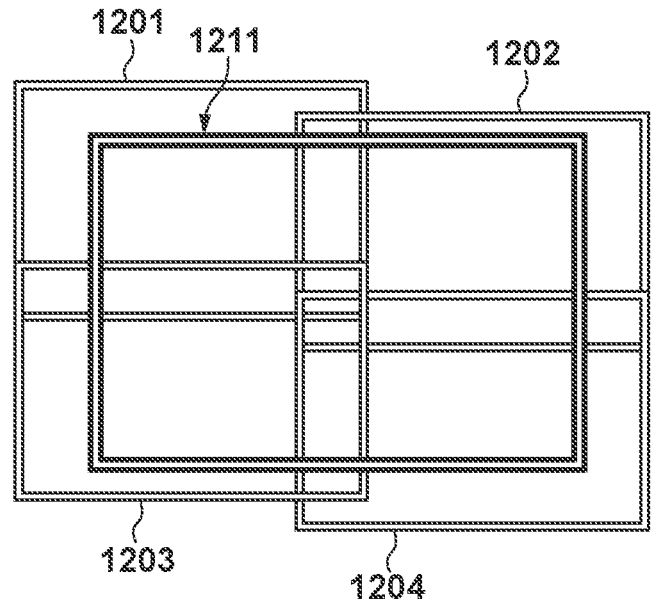
FIG. 12B
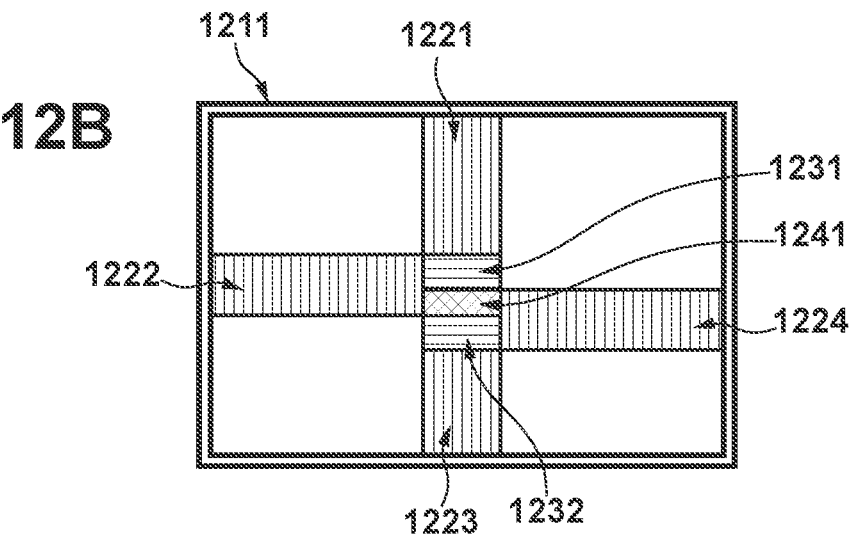

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a technique for generating a composited image by positionally aligning and compositing a plurality of images.

Description of the Related Art

In inspection of a building, in technique for detecting defect such as cracking from a captured image, it is a requirement that the image be focused, and clear. Also, in order to detect a small defect in an inspection target range, a high-resolution image (high-resolution image) is needed, and so a method of generating one composited image by compositing a plurality of high-resolution images is employed. When generating the composited image, Japanese Patent Laid-Open No. 2006-175620 and Japanese Patent No. 6513309 perform positional alignment using overlapping regions set when capturing in relation to adjacent images, and then composite the images.

However, the objective of techniques as disclosed in Japanese Patent Laid-Open No. 2006-175620 and Japanese Patent No. 6513309 is to generate the composited image as a panorama photograph such as a landscape photograph, and processing is performed so that the joint between the images is not noticeable and looks smooth. At this time, blend processing (processing that takes an average of the pixel values of the respective images for every pixel) is performed on the overlapping region for positional alignment, but there are effects on the image quality of the overlapping region including those that cause deterioration in one region such as blurring. The result of this is that there is an effect on the detection of small defect in the image.

SUMMARY OF THE INVENTION

In the present invention, a technique for, in a case where a composited image is generated by positionally aligning and compositing a plurality of images, reducing a deterioration in image quality of an overlapping region between images that occurs due to the positional alignment is provided.

According to the first aspect of the present invention, there is provided an image processing apparatus comprising: one or more processors, wherein the one or more processors function as: a first obtaining unit configured to obtain a plurality of images having an overlapping region which is a region that is captured by overlapping at least a portion of a capturing target; a second obtaining unit configured to obtain in-focus degree information in the overlapping region of each of the plurality of images, wherein the in-focus degree information indicates a degree of focus for each predetermined region of the image; and a compositing unit configured to, based on the in-focus degree information of each of the plurality of images, generate a composited image for which the plurality of images are composited.

According to the second aspect of the present invention, there is provided an image processing method, comprising: obtaining a plurality of images having an overlapping region which is a region that is captured by overlapping at least a portion of a capturing target; obtaining in-focus degree information in the overlapping region of each of the plurality of images, wherein the in-focus degree information indicates a degree of focus for each predetermined region of the image; and based on the in-focus degree information of each of the plurality of images, generating a composited image for which the plurality of images are composited.

According to the third aspect of the present invention, there is provided a non-transitory computer-readable storage medium storing a computer program for causing a computer to function as a first obtaining unit configured to obtain a plurality of images having an overlapping region which is a region that is captured by overlapping at least a portion of a capturing target; a second obtaining unit configured to obtain in-focus degree information in the overlapping region of each of the plurality of images, wherein the in-focus degree information indicates a degree of focus for each predetermined region of the image; and a compositing unit configured to, based on the in-focus degree information of each of the plurality of images, generate a composited image for which the plurality of images are composited.

Further features of the present invention will become apparent from the following description of exemplary embodiments (with reference to the attached drawings).

BRIEF DESCRIPTION OF THE DRAWINGS

FIG. 3A is a view for illustrating an example of a configuration of a table.

FIG. 3B is a view for illustrating an example of a configuration of overlapping region information.

FIG. 4 is a flowchart of processing that an image processing apparatus 100 performs to generate a composited image by positionally aligning and compositing a plurality of images.

FIG. 8 is a view for illustrating an example of the composited image.

FIG. 9A is a view for illustrating a defocus map 901 of an image 801.

FIG. 9B is a view for illustrating a defocus map 902 of an image 802.

FIGS. 11A through 11C are views for describing processing for, in a case where a selection image is the image 801, obtaining a partial region corresponding to the image 801.

FIGS. 12A and 12B are views for describing a third embodiment.

DESCRIPTION OF THE EMBODIMENTS

Figure 1:
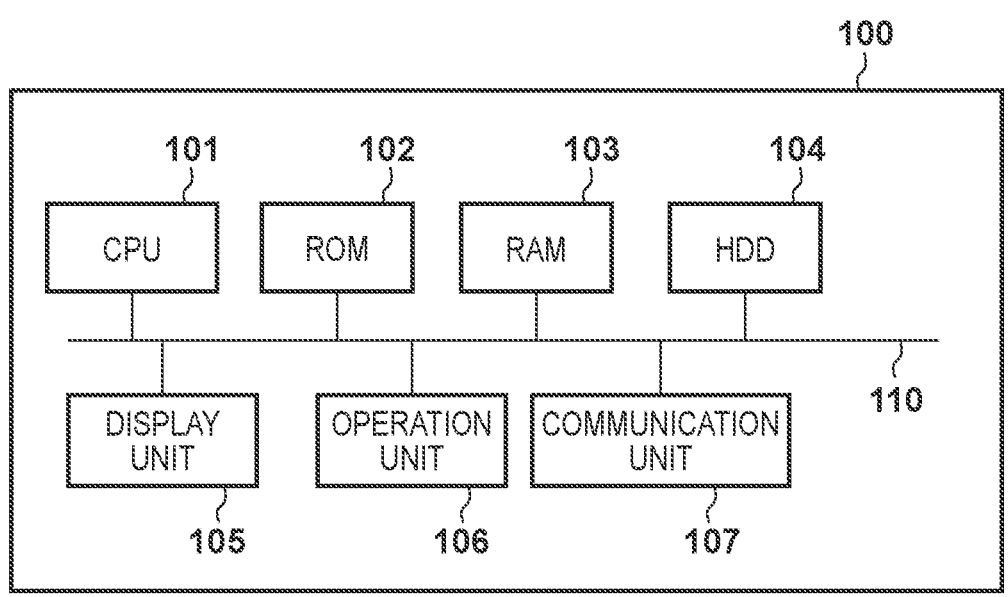
FIG. 1 is a block diagram illustrating an exemplary hardware configuration of an image processing apparatus 100.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the present embodiment, the composited image is generated by positionally aligning and compositing a plurality of images. At that time, a defocus map of each image that shares an overlapping region between the images which is generated by the positional alignment is generated, and an image to be used for the overlapping region of composited image among those respective images is selected based on the defocus maps of the respective images. Then, a partial image corresponding to the overlapping region in the selected image is obtained, and the obtained partial image is composited with the overlapping region in the composited image. First, an example of a hardware configuration of an image processing apparatus 100 according to the present embodiment will be described using the block diagram of FIG. 1.

A CPU 101 executes each kind of processing using a computer program and data stored in a RAM 103 or a ROM 102. By this, the CPU 101, in addition to controlling operation of the image processing apparatus 100 on the whole, executes or controls each process that will be described later as something that the image processing apparatus 100 performs.

In the ROM 102, setting data for the image processing apparatus 100 that need not be overwritten, computer programs and data pertaining to the basic operations of the image processing apparatus 100, and computer programs and data pertaining to the activation of the image processing apparatus 100 are stored.

The RAM 103 has an area for storing computer programs and data that are loaded from the ROM 102 and the HDD (hard disk drive) 104, and computer programs and data that are received from the external apparatus by a communication unit 107. Furthermore, the RAM 103 has a work area that is used when the CPU 101 executes each kind of processing. In this way, the RAM 103 can appropriately provide various areas.

An HDD 104 stores an OS (operating system) and computer programs and data for causing the CPU 101 to execute or control each process that will be described later as something that the image processing apparatus 100 performs. The computer programs and data saved in the HDD 104 are appropriately loaded into the RAM 103 under the control of the CPU 101 and processed by the CPU 101.

Note that the HDD 104 is given as one example of a storage apparatus, and in addition to or instead of the HDD 104, another type of storage apparatus may be employed. Such a storage apparatus can be realized by, for example, a medium (a recording medium), a computer program corresponding to the medium, and a drive apparatus for performing reading/writing of data. Known examples of such a medium include a flexible disk (FD), a CD-ROM, a DVD, a USB memory, an MO, a flash memory, and the like. Also, as such a storage apparatus, a flash memory such as a USB memory or a server apparatus that is connected so as to be able to communicate with the image processing apparatus 100 may be employed.

A display unit 105 is an apparatus for displaying by images or text results of processing by the CPU 101, and for example, is implemented with a liquid crystal display (LCD), an organic electroluminescence display (OLED), a touch panel screen, or the like. Note that in FIG. 1, the image processing apparatus 100 is configured to have the display unit 105, but the invention is not limited to such a configuration, and, for example, the display unit 105 may be an external apparatus that can communicate by wire or wirelessly with the image processing apparatus 100. Also, the display unit 105 may be a projection apparatus such as a projector for projecting images and text.

An operation unit 106 is a user interface such as a keyboard, a mouse, or a touch panel screen, and by a user operation thereon, it is possible to input each type of instruction to the CPU 101.

The communication unit 107 functions as a communication interface for performing data communication with external apparatuses, and the image processing apparatus 100 can perform data communications with external apparatuses by the communication unit 107.

The CPU 101, the ROM 102, the RAM 103, the HDD 104, the display unit 105, the operation unit 106, the communication unit 107 are all connected to a bus 110. Note that the hardware configuration illustrated in FIG. 1 is only one example of a configuration that can execute each process described below, and definition variants/modifications are also possible.

Next, processing that the image processing apparatus 100 performs in order to generate a composited image by positionally aligning and compositing a plurality of images will be described in accordance with the flowchart of FIG. 4.

In step S401, the CPU 101 first obtains a plurality of images (input images) to be compositing targets. The obtainment source of the plurality of images is not limited to a particular obtainment source. For example, the CPU 101 may read a plurality of images to be compositing targets from the HDD 104, and may download the plurality of images to be compositing targets from an external apparatus by the communication unit 107. Also, an image capturing unit is arranged on the inside or externally to the image processing apparatus 100, and the CPU 101 may obtain the plurality of images (captured images) captured by the image capturing unit as compositing targets.

In the present embodiment, it is assumed that in the HDD 104, a table 301 that defines the vertical/horizontal size (width and height) of the composited image to be exemplified in FIG. 3A and filenames of the images to be compositing targets is recorded in advance. The table 301 defines that the width of the composited image is 5000 pixels, and the height of the composited image is 2000 pixels. Also, in the table 301, it is defined that the filenames of the images to be the compositing targets are the filenames "IMG_0013.jpg" and "IMG_0014.jpg".

Therefore, in step S401, the CPU 101 references the filename of the image to be the compositing target recorded in the table 301, and obtains from the HDD 104 or the like the image of the filename "IMG_0013.jpg" and the image of the filename "IMG_0014.jpg". Below, the width and height of the image of the filename "IMG_0013.jpg" and the image of the filename "IMG_0014.jpg" are 3000 pixels and 2000 pixels respectively. Also, the images to be the compositing target may be images for which distortion correction or keystone effect correction was performed.

Next, the CPU 101 performs positional alignment of the plurality of images (the image whose filename is "IMG_0013.jpg" and the image whose filename is "IMG_0014.jpg") obtained as compositing targets, and decides the respective positions of the plurality of images in the composited image. Note that the positional alignment of the plurality of images may be performed by a known method. For example, feature points of each image may be calculated using a SIFT (Scale Invariant Feature Transform) method, and matching between images of feature points may be performed to perform the positional alignment between the images.

In step S402, the CPU 101, for an overlapping region between the images that is produced from the positional alignment of the images performed in step S401, generates information for specifying the overlapping region, and generates overlapping region information including the generated information.

Here, a case where a composited image is generated by positionally aligning and compositing the image of the filename "IMG_0013.jpg" and the image of the filename "IMG_0014.jpg" will be described by using FIGS. 2A to 2D.

Figure 2A:
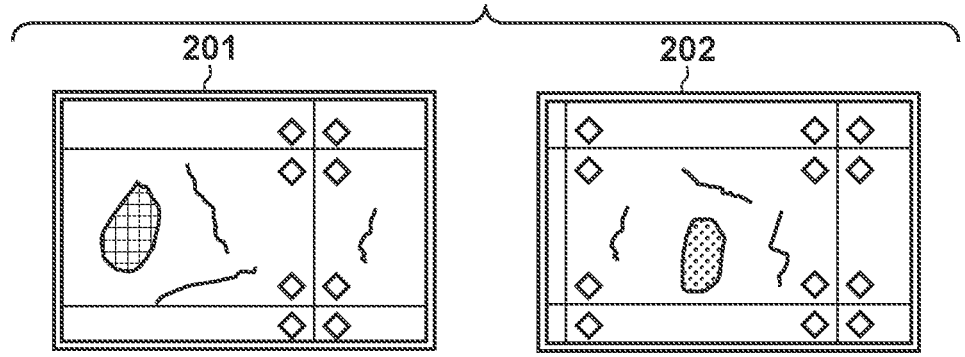
FIGS. 2A through 2D are views for describing generation of a composited image.
Figure 2B:
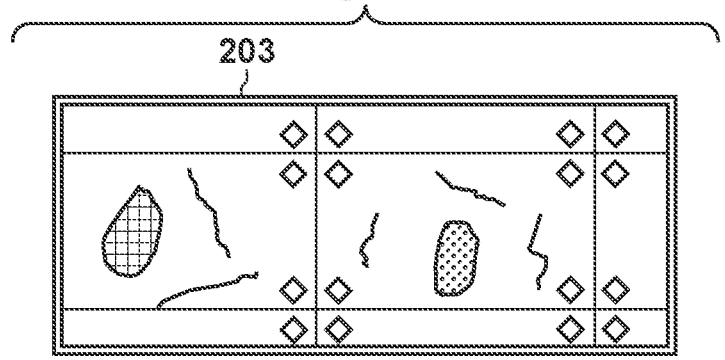
Figure 2C:
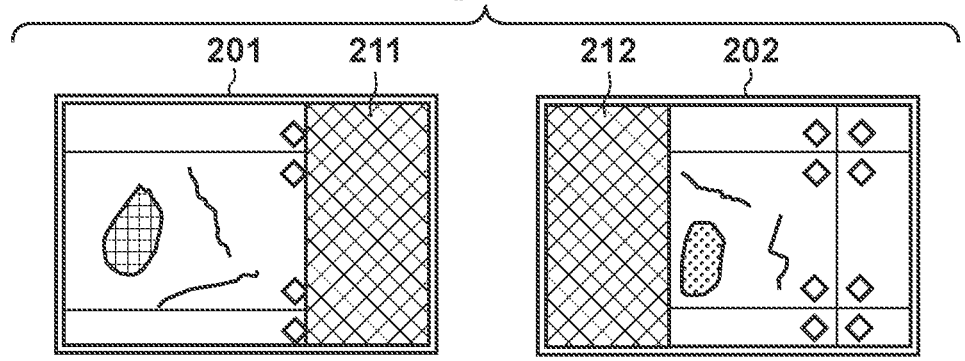
Figure 2D:
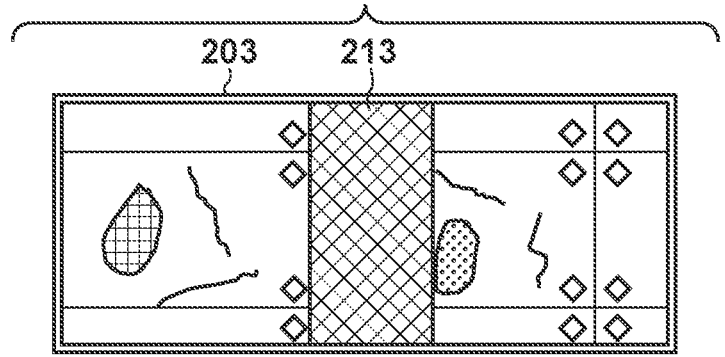

FIG. 2A illustrates an image 201 (the image of the filename "IMG_0013.jpg") and an image 202 (the image of the filename "IMG_0014.jpg") to be the compositing targets. In FIG. 2B, a composited image 203 generated by positionally aligning and compositing the image 201 and the image 202 is illustrated. Here, as shown in FIG. 2C, image content included in an image region 211 in the image 201, and image content included in an image region 212 in the image 202 are the same (or similarity is high). The result of positionally aligning the image 201 and the image 202 is that the image region 211 and the image region 212 are regions (overlapping regions) that overlap each other. The image region 211 and the image region 212 are used as positional alignment regions for when compositing the image 201 and the image 202, and the result is that, as shown in FIG. 2D, the image region 211 and the image region 212 end up corresponding to an overlapping region 213 in the composited image 203.

Therefore, in step S402, the CPU 101 generates overlapping region information including information defining the image region 211 corresponding to the overlapping region 213 in the image 201 and information defining the image region 212 corresponding to the overlapping region 213 in the image 202. An example of a configuration of the overlapping region information is illustrated in FIG. 3B.

The "overlapping region ID" is a unique identifier that the CPU 101 issues for each overlapping region that is produced by the positional alignment of the image 201 and the image 202. As shown in FIGS. 2A to 2D, there is only one overlapping region 213 produced by the positional alignment of the image 201 and the image 202, and in FIG. 3B, the overlapping region ID="0" that the CPU 101 issued for this overlapping region 213 is recorded.

"Composited region coordinates" are the coordinates (2000, 0) in the upper-left corner and the coordinates (3000, 2000) in the bottom-right corner of the overlapping region 213 in the composited image 203 when the position in the upper left corner of the composited image 203 is set as the origin point. Note that in FIG. 3B an example in which the overlapping region is a rectangle is illustrated and therefore the composited region coordinates are coordinate information by which the rectangular region can be specified. However, the shape of the overlapping region is not limited to a rectangle, and whatever the shape may be, information that defines the overlapping region is registered in the composited image for the overlapping region coordinates.

"image1_filename" is the filename "IMG_0013.jpg" of the image 201. "image1_overlapping region coordinates" is the coordinates (2000, 0) of the upper-left corner of the image region 211 and the coordinates (3000, 2000) of the bottom-right corner corresponding to the overlapping region 213 in the image 201 when the position of the upper-left corner of the image 201 is set as the origin point.

"image2_filename" is the filename "IMG_0014.jpg" of the image 202. "image2_overlapping region coordinates" is the coordinates (0, 0) in the upper-left corner and the coordinates (1000, 2000) in the bottom-right corner of the image region 212 corresponding to the overlapping region 213 in the image 202 when the position in the upper-left corner of the image 202 is made to be the origin point.

In this way, in a case where the number of images sharing the overlapping region corresponding to the overlapping region ID="0" is N (where N is an integer greater than or equal to 2), the set of "image i_filename" and "image i_overlapping region coordinates" for i=1, ..., N is included in the overlapping region information in association with the overlapping region ID="0".

In step S403, the CPU 101 performs processing to select an image to be used for the overlapping region 213 from the image 201 and the image 202. Details of the processing in step S403 will be described later using the flowchart in FIG. 5.

In step S404, the CPU 101 extracts, from the image selected in step S403, an image (partial image) within the image region corresponding to the overlapping region 213, specifically an image within the image region 211 if it is the image 201 and an image within the image region 212 if it is the image 202. Then, the CPU 101 composites the extracted partial image in the overlapping region 213 of the composited image 203, and outputs the composited image 203 resulting from the compositing. The output destination for the composited image 203 is not limited to a specific output destination. For example, the CPU 101 may cause the display unit 105 to display the composited image 203 by outputting the composited image 203 to the display unit 105, and may cause the HDD 104 to save the composited image 203 by outputting the composited image 203 to the HDD 104. Also, the CPU 101 may control the communication unit 107 to output (transmit) the composited image 203 to an external apparatus.

Figure 5:
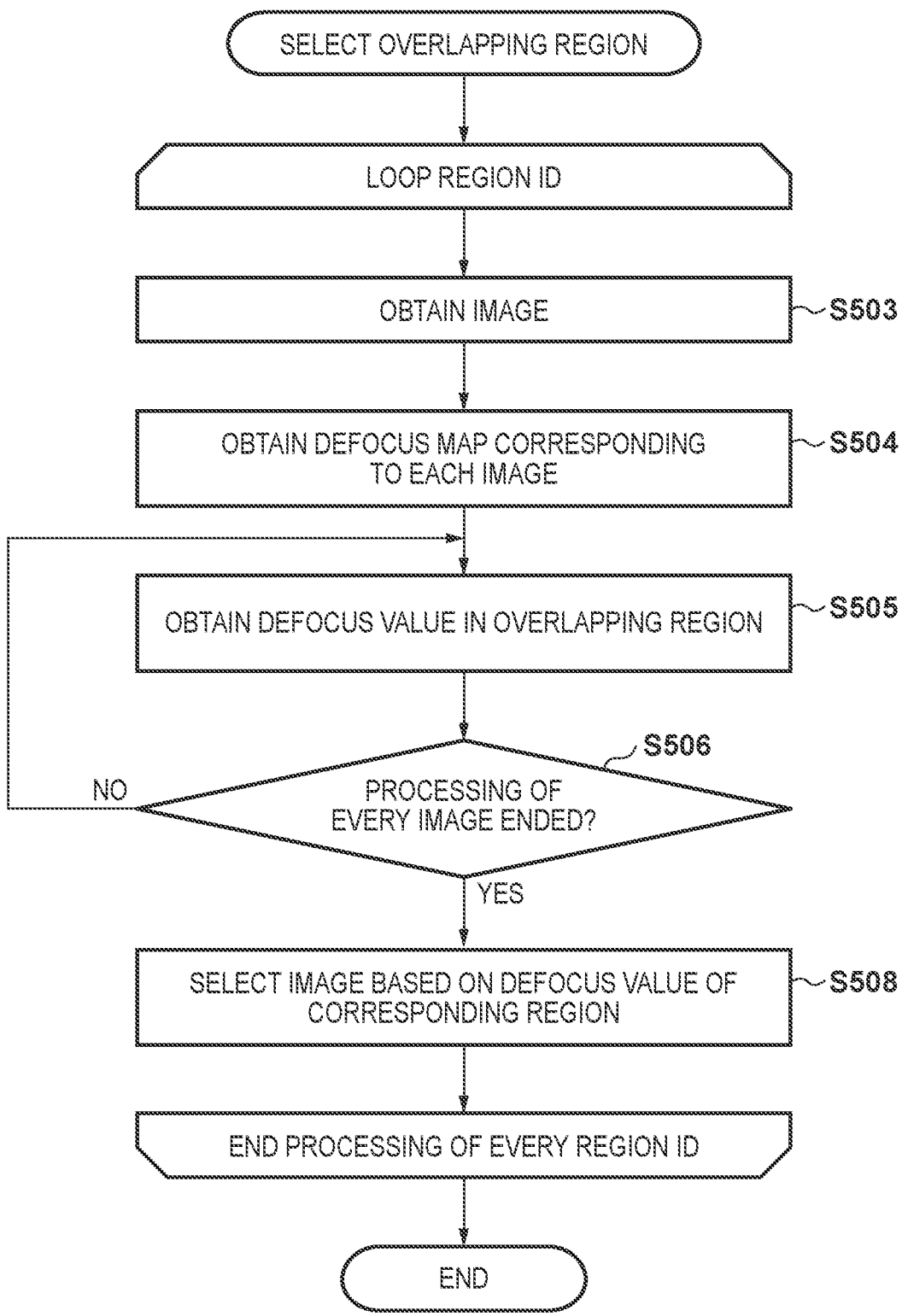
FIG. 5 is a flowchart for illustrating details of processing of step S403.

Next, details of the processing for selecting the image in the aforementioned step S403 will be described in accordance with the flowchart of FIG. 5. In the flowchart of FIG. 5, processing of the step S503 to the step S508 is performed for the respective overlapping region IDs registered in the overlapping region information. In the present embodiment, since there is only one overlapping region ID registered in the overlapping region information, the processing of step S503 to step S508 is performed on that one overlapping region ID.

In step S503, the CPU 101 selects, as a single not yet selected "selection overlapping region ID" out of the overlapping region IDs registered in the overlapping region information, and specifies the filename registered in the overlapping region information in association with the selection overlapping region ID. In the example of FIG. 3B, the filenames "IMG_0013.jpg" and "IMG_0014.jpg" are registered in the overlapping region information in association with selection overlapping region ID="0" are specified. Then, the CPU 101 obtains the image 201 of the filename "IMG_0013.jpg" and the image 202 of "IMG_0014.jpg" from the HDD 104 or the like.

In step S504, the CPU 101 generates a defocus map expressing an in-focus degree corresponding to each pixel of the image for the image 201 and the image 202 obtained from the HDD 104 or the like in step S503 respectively.

Figure 6:
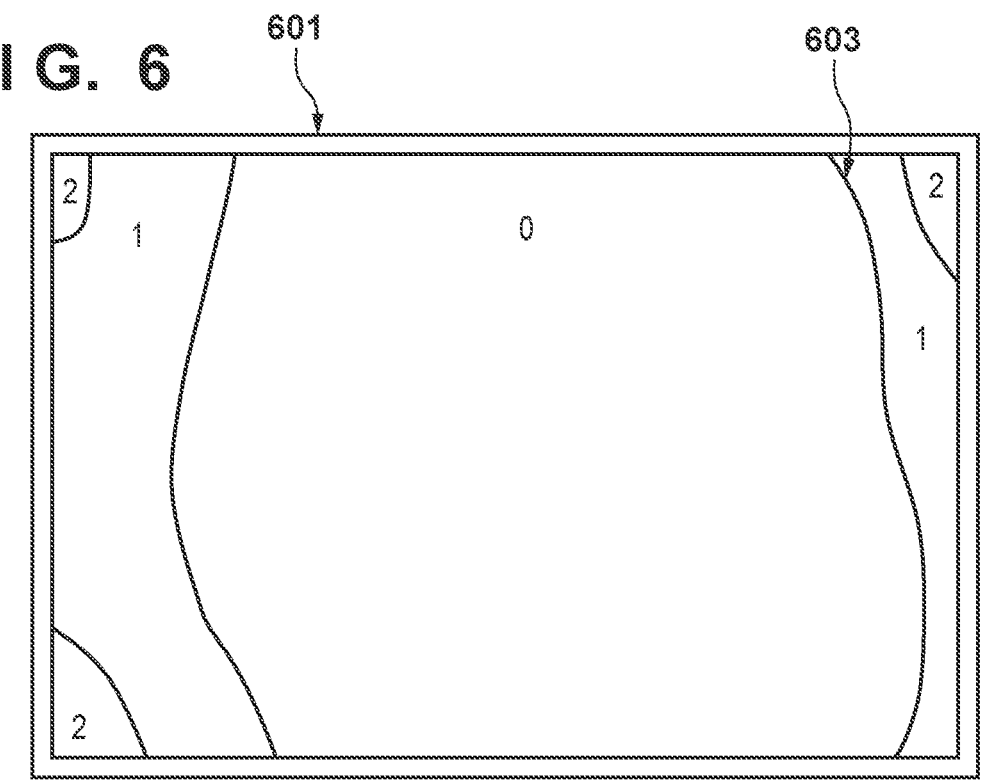
FIG. 6 is a view for illustrating an example of a defocus map.

An example of a defocus map generated for a particular image (an image of interest) is illustrated in FIG. 6. The width and height of a defocus map 601 is the same as the width and height of the image of interest respectively. Also, the value (defocus value) in the pixel position (x, y) of the defocus map 601 is a value for which a front/rear deviation amount from the focus corresponding to a target object appearing at a pixel position (x, y) of the image of interest is digitized as an absolute value.

The defocus value, for example, can be obtained as information of the defocus amount at the position of the pixel by using an image plane phase difference imaging sensor when performing image capturing of the image of interest. Note that, it is possible to use a publicly known technique regarding the method for obtaining information of the defocus value. For example, automatic focusing technique using a front/rear deviation amount of the focus detected from the image plane phase difference imaging sensor has been widely used practically in the past.

The region for which "0" is allocated in the defocus map 601 of FIG. 6 indicates a region 0 made up of the set of pixels having the defocus value "0". The region for which "1" is allocated in the defocus map 601 of FIG. 6 indicates a region 1 made up of the set of pixels having the defocus value "1". The region in which "2" is allocated in the defocus map 601 of FIG. 6 indicates a region 2 made up of the set of pixels having the defocus value "2". A boundary line 603 indicates a boundary line between regions (region 0, region 1, region 2).

The region 0 is a region for which there is no out-of-focus in in-focus units of the capturing apparatus that captured the image of interest. The region 1 is a region where the in-focus degree is lower (a degree of blurring is high) than the region 0, and the region 2 is a region for which the in-focus degree is lower than the region 1. In this way, a region with a higher defocus value is a region with a lower in-focus degree.

Figure 7A:
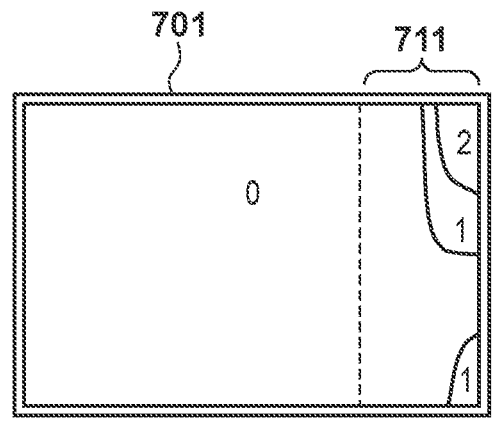
FIG. 7A is a view for illustrating an example of a defocus map of an image 201.
Figure 7B:
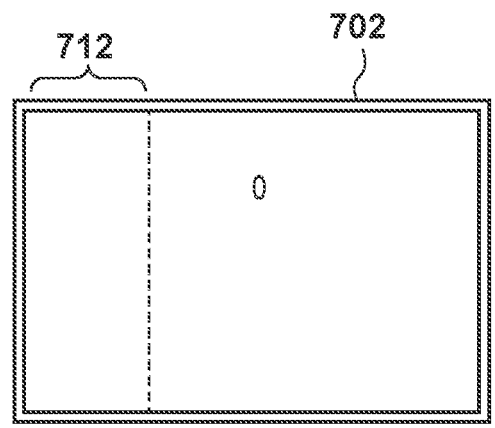
FIG. 7B is a view for illustrating an example of a defocus map of an image 202.

Example of defocus maps generated for the image 201 and the image 202 respectively are illustrated in FIG. 7A and FIG. 7B. In a defocus map 701 generated for the image 201, the region 0, the region 1, and the region 2 are included in a corresponding region 711 which corresponds to the overlapping region 213 (the image region 211). In a defocus map 702 generated for the image 202, only a region 0 is included in a corresponding region 712 which corresponds to the overlapping region 213 (the image region 212).

In step S505, the CPU 101 selects one of the not yet selected images from among the image 201 and the image 202 as the "selection image". Then, the CPU 101 obtains a defocus value in a corresponding region that corresponds to the overlapping region 213 in the defocus map corresponding to the selection image.

In step S506, the CPU 101 determines whether or not both the image 201 and the image 202 have been selected as the selection image. If the result of this determination is that both the image 201 and the image 202 have been selected as the selection image, the processing proceeds to step S508. Meanwhile, in the case where an image that has not been selected yet as the selection image among the image 201 and the image 202 remains, the processing advances to step S505.

By such processing, the CPU 101 obtains the defocus value in the corresponding region 711 that corresponds to the overlapping region 213 in the defocus map 701. The corresponding region 711 is a region of the defocus map 701 that corresponds to the image region 211 that was specified by the "image1_overlapping region coordinates" in the overlapping region information. Also, the CPU 101 obtains the defocus value in the corresponding region 712 corresponding to the overlapping region 213 in the defocus map 702. The corresponding region 712 is a region of the defocus map 702 that corresponds to the image region 212 that is specified by the "image2_overlapping region coordinates" in the overlapping region information.

In step S508, the CPU 101 selects an image to use for the overlapping region 213 of the composited image 203 among the image 201 and the image 202 based on a defocus value in the corresponding region 711 of the defocus map 701 and a defocus value in the corresponding region 712 of the defocus map 702.

Various methods for selecting the image to use for the overlapping region 213 of the composited image 203 among the image 201 and the image 202 based on the defocus value in the corresponding region 711 and the defocus value in the corresponding region 712 can be considered.

For example, the CPU 101 may count the number N1 of pixels whose defocus value is "0" in the corresponding region 711 and the number N2 of pixels whose defocus value is "0" in the corresponding region 712. Then, the CPU 101 selects the image 201 as the image to be used for the overlapping region 213 of the composited image 203 if N1>N2 and selects the image 202 as the image to be used for the overlapping region 213 of the composited image 203 if N1<N2. In the examples of FIGS. 7A and 7B, as described above, whereas pixels whose defocus value is not "0" are included in the corresponding region 711 as described above, the corresponding region 712 is configured only by pixels whose defocus value is "0", and therefore N1<N2. Therefore, in this case, the image 202 is selected as the image to be used in the overlapping region 213 of the composited image 203.

Note that in the case where N1=N2, for example, the CPU 101 counts the number of pixels M1 whose defocus value is "1" in the corresponding region 711 and the number M2 of pixels whose defocus value is "1" in the corresponding region 712. Then, the CPU 101, if M1>M2, selects the image 201 as the image to be used in the overlapping region 213 of the composited image 203, and selects the image 202 as the image to be used in the overlapping region 213 of the composited image 203 if M1<M2.

Also, in a case where M1=M2, the CPU 101 counts the number of pixels P1 whose defocus value is "2" in the corresponding region 711 and the number of pixels P2 whose defocus value is "2" in the corresponding region 712. Then, the CPU 101 selects the image 201 as the image to be used for the overlapping region 213 of the composited image 203 if P1>P2, and selects the image 202 as the image to be used for the overlapping region 213 of the composited image 203 if P1<P2.

Also, if P1=P2, either of the image 201 and the image 202 may be selected as the image to be used for the overlapping region 213 of the composited image 203, and the selection criteria in that case is not limited to specific selection criteria. For example, whichever of the image 201 and the image 202 has the older/newer capturing date/time may be selected or a random selection may be made.

Also, the following method, for example, may be considered as another method for selecting the image to be used for the overlapping region 213 of the composited image 203 among the image 201 and the image 202, based on the defocus value in the corresponding region 711 and the defocus value in the corresponding region 712.

For example, the CPU 101 may calculate a total value/average value AV1 of the defocus value in the corresponding region 711 and a total value/average value AV2 of the defocus value in the corresponding region 712. Then, the CPU 101 may select the image 201 as the image to be used for the overlapping region 213 of the composited image 203 if the AV1<N2 and select the image 202 as the image to be used for the overlapping region 213 of the composited image 203 if the AV1>AV2.

Also, configuration may be taken so as to select the image to be used for the overlapping region 213 of the composited image 203 based on the defocus value in a region (in a non-corresponding region) other than regions that correspond in the respective defocus maps of the image 201 and the image 202.

For example, the CPU 101 may apply a "proportion of the number of pixels whose defocus value is "0" in the region corresponding to the number of pixels of the region other than the corresponding region 711 in the defocus map 701" to the above-described N1, and apply a "proportion of the number of pixels whose defocus value is "0" in the region corresponding to the number of pixels of the region other than the corresponding region 712 in the defocus map 702" to the above-described N2.

Also, for example, the CPU 101 may apply the "number of pixels whose defocus value is "0" in a region other than the corresponding region 711 in the defocus map 701" to the above-described N1, and apply the "number of pixels whose the defocus value is "0" in a region other than the corresponding region 712 in the defocus map 702" to the above-described N2.

Also, from the respective defocus maps of the image 201 and the image 202, a distribution of pixels whose defocus value is not 0 may be obtained, and selection candidates for the image to be used for the overlapping region 213 of the composited image 203 may be narrowed down using that distribution. In a case where defocus values that are not 0 are dispersed in the defocus map of the image of interest, there is the possibility that the image of interest cannot be trusted due to the presence of noise during the capturing of the image of interest, and therefore such an image of interest may be excluded from the selection candidates. Then, from the images remaining as selection candidates, an image to be used for the overlapping region 213 of the composited image 203 may be selected by any of the above-described methods.

Also, the selection of the image to be used for the overlapping region 213 of the composited image 203 among the image 201 and the image 202 is not limited to being based on the defocus values in the corresponding regions 711 and 712, and, for example, the following method of selection may be considered.

For example, in the image region of the composited image, a subject region where a defect such as a crack which is the detection target is likely to appear may be identified in advance, and the image selection may be performed similarly to the description above based on the defocus values of the image 201 and the image 202 corresponding to the subject region.

In this way, in the present embodiment, it is possible to generate a composited image in which an image that is less out-of-focus is applied to an image region (overlapping region) that overlaps when compositing by positionally aligning a plurality of images. By this, since a composited image having the overlapping region configured by the clearer image is achieved, it is possible to detect a defect such as thin cracking from such a composited image.

Note that the so-called inspection processing for detecting a defect such as cracking in a composited image may be performed by the image processing apparatus 100 or may be performed by an external apparatus. In the case of the former, the image processing apparatus 100, after having performed such an inspection process, displays the result of the inspection processing on the display unit 105 using the image and text. Note that in the case of the latter, the image processing apparatus 100 transfers the generated composited image to the external apparatus or to an apparatus that the external apparatus can access.

Second Embodiment

In the following, a difference between a second embodiment and the first embodiment is described, and it is assumed that the second embodiment is the same as the first embodiment unless otherwise specified. In the first embodiment, the image to be used for the overlapping region 213 of the composited image 203 is made to be either one of the image 201 and the image 202. In the present embodiment, a partial region having a predetermined defocus value is obtained from the corresponding region corresponding to the overlapping region 213 in the defocus maps of the image 201 and the image 202. Then, an image corresponding to these partial regions in the image 201 and the image 202 is combined and that is composited in the overlapping region 213 of the composited image 203.

FIG. 8 illustrates an example of a composited image according to the present embodiment. In FIG. 8, a composited image 803 is generated by positionally aligning and compositing an image 801 and an image 802. The overlapping region is generated between the image 801 and the image 802 at the time of the positional alignment. The images in the partial region corresponding to a region 811 in the overlapping region and the region 811 in the image 801 are composited, and the images in the partial region corresponding to a region 812 in the overlapping region and the region 812 in the image 802 are composited.

FIG. 9A illustrates a defocus map 901 of the image 801 and FIG. 9B illustrates a defocus map 902 of the image 802. In the defocus map 901, the corresponding region 911 is a region corresponding to the overlapping region between the image 801 and the image 802, the corresponding region 912 in the defocus map 902 is a region corresponding to the overlapping region between the image 801 and the image 802.

In the present embodiment, the region corresponding to the region 811 in the image 801 is decided based on the defocus values in the corresponding region 911, and the image in the decided region is composited in the region 811. Similarly, the region corresponding to the region 812 in the image 802 is decided based on the defocus values in the corresponding region 912, and the image in the decided region is composited in the region 812.

Figure 10:
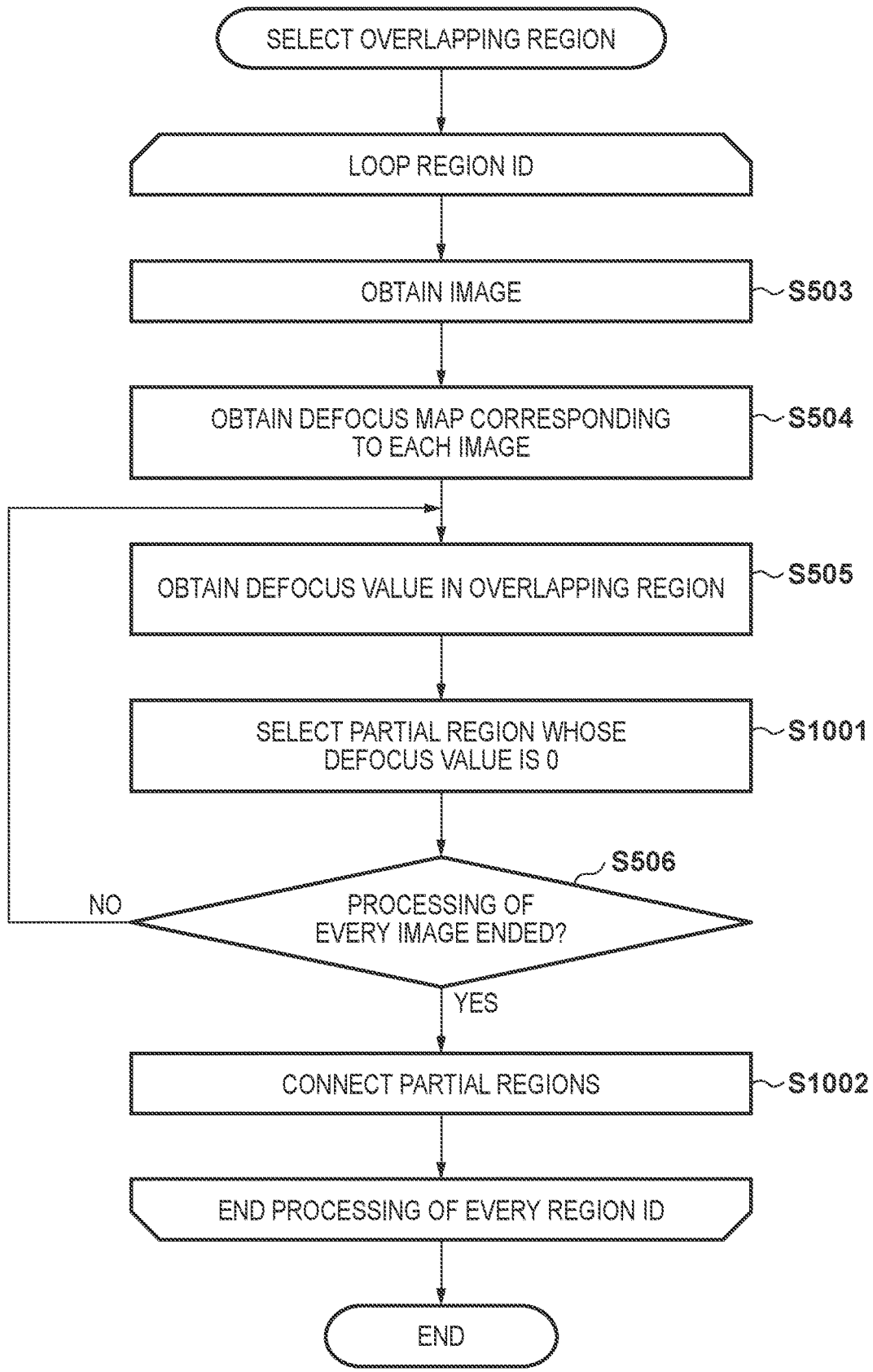
FIG. 10 is a flowchart of processing that the image processing apparatus 100 performs to generate a composited image 803 by positionally aligning and compositing the image 801 and the image 802.

Next, processing that the image processing apparatus 100 performs in order to generate a composited image 803 by positionally aligning and compositing the image 801 and the image 802 will be described in accordance with the flowchart of FIG. 10. Note that in FIG. 10, the same step numbers are given to processing steps that are the same as the processing steps illustrated in FIG. 5, and description for such processing steps is omitted.

In step S1001, the CPU 101 references "defocus values in the corresponding region corresponding to the overlapping region 213 in the defocus map corresponding to the selection image" obtained in step S505, and obtains a "region made up of pixels whose defocus value is '0''from the corresponding region as a partial region.

In a case where the selection image is the image 801, processing for obtaining the partial region corresponding to the image 801 is described using FIGS. 11A through 11C. In step S1001, the CPU 101 obtains, as the partial region 1103 illustrated in FIG. 11C, from the corresponding region 911 illustrated in FIG. 11A a remaining region after eliminating "a rectangular region 1102 that encloses a region of pixels whose defocus value is not 0" illustrated in FIG. 11B. Similar processing is performed for the image 802, and obtains a partial region corresponding to the image 802 as the result.

In step S1002, the CPU 101 combines (joins together) the partial image in the image 801 corresponding to the partial region obtained in step S1001 for the defocus map 901 and the partial image in the image 802 corresponding to the partial region obtained in step S1001 for the defocus map 902, and generates an image that is to be composited in the overlapping region of the composited image 803. The partial image in the image 801 corresponding to the partial region obtained in step S1001 for the defocus map 901 is composited in the region 811. The partial image in the image 802 corresponding to the partial region obtained in step S1001 for the defocus map 902 is composited in the region 812.

Note that in a case where a portion that overlaps between the partial images occurs when combining (joining together) partial images, either of the partial images may be used for that portion. For example, as described in the first embodiment, a partial region of the image that is older than the image capture date-time may be used or a random selection may be used.

Also, for a part where the partial image does not exist (the set of pixels for which the defocus value is not 0) in the overlapping region in the composited image 803, a portion of whose defocus value is lowest may be selected among the portions of the image to be used for composition.

In this way, by virtue of the present embodiment, for each region into which the overlapping region is finely divided, a clearer image can be allocated, and as a result, a more correct crack defect detection can be performed.

Note that in the present embodiment, the "region of pixels whose defocus value is not 0" is indicated with the rectangular region 1102 which encloses the region, and the partial region 1103 is obtained by eliminating the rectangular region 1102 from the corresponding region 911. However, the region enclosing the "region of pixels whose defocus value is not 0" is not limited to a rectangular region, and may be a region of another shape. Also, in relation to the region A whose defocus value is not 0, if the defocus value of a region B corresponding to the region A in another image is 0, the region A may be replaced with the region B.

Third Embodiment

In each embodiment described above, an example of compositing two adjacent images, as illustrated in FIGS. 2A to 2D and FIG. 8, is given, but the invention is not limited to this, and similar processing may be applied even in the case where two or more images are composited.

For example, a composited image 1211 illustrated in FIG. 12A is a composited image resulting from positionally aligning and compositing an image 1201, an image 1202, an image 1203, and an image 1204. The result of such positional alignment is that overlapping regions 1221 to 1224 in which two images overlap, overlapping regions 1231 and 1232 in which three images overlap, and overlapping region 1241 in which four images overlap are generated, as illustrated in FIG. 12B. In such a case, for an image in which the overlapping region 1221 and the overlapping region 1231 are composited in the overlapping region 1241, the image 1201 is used, and for an image in which the overlapping region 1222 and the overlapping region 1223 and the overlapping region 1232 are composited, the image 1203 is used. Note that the images to be composited in one overlapping region may be generated from a plurality of images, as in the second embodiment.

Note the configurations of the numerical values, the process timings, processing order, and information used in the above description are examples for giving a detailed explanation, and there is no intention to limit the invention to configurations of these numerical values, process timings, processing orders, and information.

Further, some or all of the embodiments described above may be used in combination as appropriate. Further, some or all of the embodiments described above may be used in a selective manner.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-058310, filed Mar. 27, 2020, which is hereby incorporated by reference herein in its entirety.

What is claimed is:
1. An image processing apparatus comprising:
one or more processors, wherein
the one or more processors function as:
a first obtaining unit configured to obtain a plurality of images having an overlapping region which is a region that is captured by overlapping at least a portion of a capturing target;

a second obtaining unit configured to obtain in-focus degree information in the overlapping region of each of the plurality of images, wherein the in-focus degree information indicates a degree of focus for each predetermined region of the image; and a compositing unit configured to, based on the in-focus degree information of each of the plurality of images, generate a composited image for which the plurality of images are composited.

2. The image processing apparatus according to claim 1, wherein the compositing unit decides, as an image to be used for the overlapping region in the composited image, an image which is selected from the plurality of images based on a value indicating the degree of focus of the overlapping region of each of the plurality of images.

3. The image processing apparatus according to claim 1, wherein the compositing unit, from among the plurality of images, decides, as an image to be used for the overlapping region in the composited image, an image which includes more of the predetermined region and is in-focus in the overlapping region.

4. The image processing apparatus according to claim 1, wherein the compositing unit, from among the plurality of images, decides, as the image to be used for the overlapping region in the composited image, an image which is selected based on a total value of each the predetermined region for a value indicating the degree of focus of the overlapping region.

5. The image processing apparatus according to claim 1, wherein the compositing unit, from among the plurality of images, decides, as the image to be used for the overlapping region in the composited image, an image which is selected based on an average value, for each the predetermined region, of values indicating the degree of focus of the overlapping region.

6. The image processing apparatus according to claim 1, wherein the compositing unit decides, as the image to be used for the overlapping region in the composited image, an image which is selected from the plurality of images based on a value indicating the degree of focus of a region other than a corresponding region corresponding to the overlapping region of each of the plurality of images.

7. The image processing apparatus according to claim 1, wherein the compositing unit, from among the plurality of images, decides a candidate for the image to be used for the overlapping region in the composited image based on a distribution of values indicating a degree of focus in a corresponding region corresponding to the overlapping region of each of the plurality of images.

8. The image processing apparatus according to claim 1, wherein the compositing unit composites regions having a value indicating a predetermined degree of focus from the overlapping region of each of the plurality of images.

9. The image processing apparatus according to claim 1, the plurality of images are respectively captured images obtained by image capturing.

10. An image processing method, comprising:
obtaining a plurality of images having an overlapping region which is a region that is captured by overlapping at least a portion of a capturing target;
obtaining in-focus degree information in the overlapping region of each of the plurality of images, wherein the in-focus degree information indicates a degree of focus for each predetermined region of the image; and
based on the in-focus degree information of each of the plurality of images, generating a composited image for which the plurality of images are composited.

11. A non-transitory computer-readable storage medium storing a computer program for causing a computer to function as
a first obtaining unit configured to obtain a plurality of images having an overlapping region which is a region that is captured by overlapping at least a portion of a capturing target;
a second obtaining unit configured to obtain in-focus degree information in the overlapping region of each of the plurality of images, wherein the in-focus degree information indicates a degree of focus for each predetermined region of the image; and
a compositing unit configured to, based on the in-focus degree information of each of the plurality of images, generate a composited image for which the plurality of images are composited.

* * * * *